US009407682B2

(12) United States Patent
Li et al.

(10) Patent No.: US 9,407,682 B2
(45) Date of Patent: Aug. 2, 2016

(54) MECHANISM TO DEREFERENCE LAYERED URI IN WEB BROWSERS USING JAVASCRIPT

(71) Applicant: Futurewei Technologies, Inc., Plano, TX (US)

(72) Inventors: Li Li, Bridgewater, NJ (US); Wu Chou, Basking Ridge, NJ (US); Tao Cai, Shenzhen (CN)

(73) Assignee: Futurewei Technologies, inc., Plano, TX (US)

( * ) Notice: Subject to any disclaimer, the term of this patent is extended or adjusted under 35 U.S.C. 154(b) by 550 days.

(21) Appl. No.: 13/751,466

(22) Filed: Jan. 28, 2013

(65) Prior Publication Data
US 2014/0215083 A1 Jul. 31, 2014

(51) Int. Cl.
  *H04L 29/06* (2006.01)
  *H04L 29/08* (2006.01)
  *G06F 17/30* (2006.01)

(52) U.S. Cl.
  CPC .......... *H04L 67/02* (2013.01); *G06F 17/30861* (2013.01)

(58) Field of Classification Search
  CPC ..... H04L 41/0806; H04L 67/02; H04L 69/28; H04L 69/03; G06F 17/30876; G06F 17/3089; G06F 17/30902; G06F 17/30861
  USPC .................. 709/230, 245, 220–222
  See application file for complete search history.

(56) References Cited

U.S. PATENT DOCUMENTS

| 8,224,975 | B1 * | 7/2012 | Liu et al. ........................ 709/228 |
| 2004/0243680 | A1 * | 12/2004 | Mayer ............................ 709/206 |
| 2005/0193124 | A1 * | 9/2005 | Chou et al. ..................... 709/228 |
| 2006/0026290 | A1 * | 2/2006 | Pulito et al. .................... 709/227 |
| 2008/0163312 | A1 * | 7/2008 | Faust et al. ........................ 725/93 |
| 2010/0149215 | A1 * | 6/2010 | Kota et al. ...................... 345/643 |
| 2011/0066741 | A1 * | 3/2011 | Hoefner et al. ................ 709/230 |
| 2011/0070873 | A1 * | 3/2011 | Balasaygun et al. .......... 455/418 |
| 2012/0254362 | A1 * | 10/2012 | Li et al. ........................... 709/218 |
| 2012/0303794 | A1 * | 11/2012 | Rodrigues ...................... 709/224 |

FOREIGN PATENT DOCUMENTS

CN 102843406 A 12/2012

OTHER PUBLICATIONS

Wikipedia. Comparison of web browsers, [retrieved on Nov. 29, 2012]. Retrieved from the Internet <URL: http://en.wikipedia.org/wiki/Comparison_of_web_browsers>.*
Foreign Communication From a Counterpart Application, PCT Application No. PCT/CN2014/071608, International Search Report dated Apr. 30, 2014, 7 pages.
Foreign Communication From a Counterpart Application, PCT Application No. PCT/CN2014/071608, Written Opinion dated Apr. 30, 2014, 5 pages.
Li, et al., "Cofocus: REST Framework for Collaborative Endpoint Network in Mobile Environment," Lecture Notes in Business Information Processing, 2001, pp. 72-87.

* cited by examiner

*Primary Examiner* — Kenneth R Coulter
(74) *Attorney, Agent, or Firm* — Conley Rose, P.C.; Grant Rodolph; William H. Dietrich

(57) ABSTRACT

An apparatus comprising a processor configured to compose a plurality of protocol stacks, and dereference a layered URI using at least one of the plurality of protocol stacks. Also, a computer program product comprising computer executable instructions stored on a non-transitory medium that when executed by a processor cause the processor to perform the following receive a layered URI, and call a URI dereference extension, wherein the dereference extension is configured to construct a protocol stack, wherein the protocol stack comprises a first connector, a second connector, and a binder, and wherein the first and second connectors are selected from a plurality of connectors based on the URI.

19 Claims, 6 Drawing Sheets

| | P2 | |
|---|---|---|
| | JAVASCRIPT | BROWSER |
| P1 JAVASCRIPT | JAVASCRIPT/JAVASCRIPT | JAVASCRIPT/BROWSER |
| BROWSER | BROWSER/JAVASCRIPT | BROWSER/BROWSER |

300

MECHANISM TO DEREFERENCE LAYERED URI IN WEB BROWSERS USING JAVASCRIPT

CROSS-REFERENCE TO RELATED APPLICATIONS

Not applicable.

STATEMENT REGARDING FEDERALLY SPONSORED RESEARCH OR DEVELOPMENT

Not applicable.

REFERENCE TO A MICROFICHE APPENDIX

Not applicable.

BACKGROUND

Web browsers are increasingly used as platforms for two-way client-server and peer-to-peer architecture communications, both in traditional electronic documents and increasingly in audio-video communications. Such communications may use layered Uniform Resource Identifiers (URIs) employing a variety of protocol stacks, e.g., Transmission Control Protocol (TCP), User Data Protocol (UDP), Hypertext Transfer Protocol (HTTP)/Stream Control Transmission Protocol (SCTP), WebSocket (WS), Datagram Congestion Control Protocol (DCCP), etc.

When a link containing a conventional URI is clicked, browsers are instructed to retrieve the representation of the resource at the URI. However, layered URIs may be problematic for certain web applications. For example, a HyperText Markup Language (HTML) webpage may contain the following multi-level URI in a link according to the following code: <a href=http://xmpp:bob@example.com/camera>This is my camera</a>. The first level of this URI is an HTTP level and the second level is an Extensible Messaging and Presence Protocol (XMPP) level. If the executing browser does not inherently support XMPP, when the link is clicked the browser may not recognize the referenced authority "xmpp:bob@example.com", e.g., because the XMPP library is defined in JavaScript. Consequently, the browser may not know the association between the authority and the XMPP library. Browsers generally cannot submit forms to URIs without knowing how to contact the authority of the URI. As the result, HTTP requests may not be invokable from built-in HTML interactions existing in the browser. Rather, web applications may have to write their own code to handle all such URIs in HTML pages, e.g., to dereference URI and submit forms. This may create an extra burden on developers for using protocol bindings.

The various communications protocol stacks are generally hidden from web applications, as no standardized JavaScript Application Programming Interfaces (APIs) are defined for them. It has historically been resource prohibitive for web browsers to support all such combinations concurrently. Consequently, web developers have generally had to either (a) wait for browsers to implement support for such protocols (which may lead to increased web browser footprints), or (b) write JavaScript to take over hyperlink interactions from the web browsers (which may increase JavaScript size and thereby reduces performance). The ability to use a layered URI may provide certain flexibility to web developers, e.g., by permitting innovation while avoiding interoperability problems.

SUMMARY

In one aspect, the disclosure includes an apparatus comprising a processor configured to compose a plurality of protocol stacks, and dereference a layered URI using at least one of the plurality of protocol stacks.

In another aspect, the disclosure includes a computer program product comprising computer executable instructions stored on a non-transitory medium that when executed by a processor cause the processor to receive a layered URI, and call a URI dereference extension, wherein the dereference extension is configured to construct a protocol stack, wherein the protocol stack comprises a first connector, a second connector, and a binder, and wherein the first and second connectors are selected from a plurality of connectors based on the URI.

In yet another aspect, the disclosure includes a method for dereferencing layered URIs, comprising receiving a layered URI at a user agent, calling a URI dereference extension, constructing a protocol stack using the URI dereference extension, wherein the protocol stack comprises a first connector, a second connector, and a binder, wherein the first connector and the second connector are instantiated based on the URI, and wherein the binder is instantiated based on the first connector and the second connector, dereferencing the URI with the URI dereference extension, and changing at least one state of the user agent using the dereferenced URI.

These and other features will be more clearly understood from the following detailed description taken in conjunction with the accompanying drawings and claims.

BRIEF DESCRIPTION OF DRAWINGS

For a more complete understanding of this disclosure, reference is now made to the following brief description, taken in connection with the accompanying drawings and detailed description, wherein like reference numerals represent like parts.

DETAILED DESCRIPTION

It should be understood at the outset that although an illustrative implementation of one or more embodiments are provided below, the disclosed systems and/or methods may be implemented using any number of techniques, whether currently known or in existence. The disclosure should in no way be limited to the illustrative implementations, drawings, and techniques illustrated below, including the exemplary designs and implementations illustrated and described herein, but may be modified within the scope of the appended claims along with their full scope of equivalents.

The disclosure describes systems and methods to permit web applications to dynamically dereference layered URIs in web browsers using JavaScript without pre-composed protocol stacks, e.g., by permitting web browsers to dynamically assemble protocol stacks from the JavaScript to access the resources identified by the layered URIs. Using the disclosed systems and methods may reduce the web browser footprint, since only core transport stacks require implementation; may reduce JavaScript code size, since only message formatting is required; may improve interoperability and performance, since web applications may mix and match protocols at runtime; and may permit web applications to experiment with new protocols and architectures using JavaScript without changing browsers.

Figure 1:
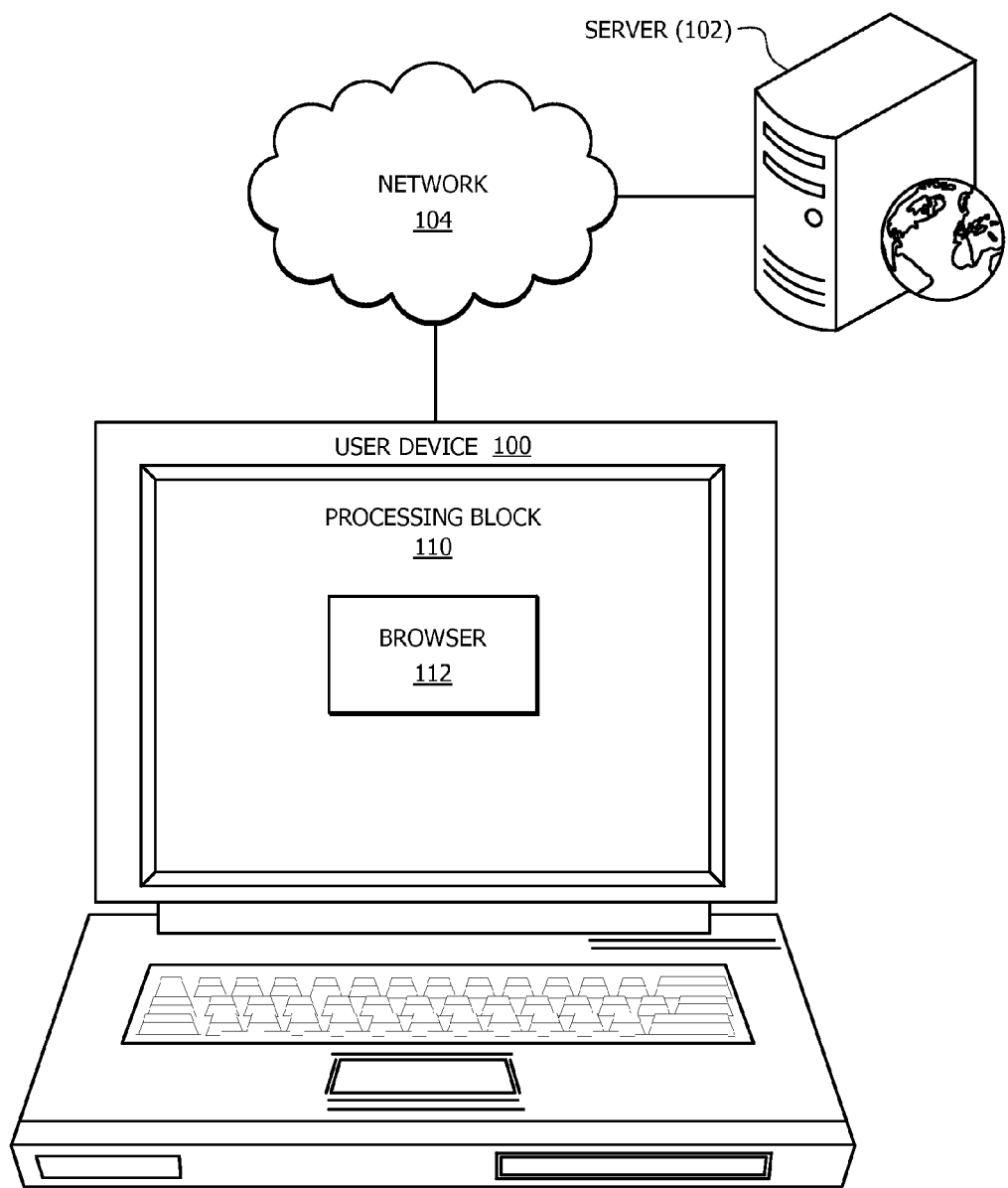
FIG. 1 illustrates an embodiment of a user device.

FIG. 1 illustrates an embodiment of a user device 100. The user device 100 may communicate with a server 102, e.g., by sending requests for and receiving HTML documents containing URIs. The user device may be coupled to the server 102 via a network 104, e.g., an Internet Protocol (IP) network, an Intranet, or any other network, such as a Local Area Network (LAN). The user device 100 may be a fixed or mobile user-oriented device, e.g., a desktop computer, a notebook or laptop computer, a netbook computer, a tablet computer, a smart phone, a personal digital assistant (PDA), or a cellular telephone. The user device 100 may comprise a processing block 110 and a browser or search application 112. The processing block 110 may be any software (e.g., operating system) and/or hardware that allows a user to configure or access the different features of the user device 100 and to install and operate other software or programs on the user device 100, e.g., the general purpose network component 700 of FIG. 7 and an operating system. The processing block 110 may include an operating system Windows®, Mac™ OS, and Android™. The browser/search application 112 may be a software or program that runs on the processing block 110 and allows the user to send search queries and receive search results on the user device 100. The browser/search application 112 may communicate with the server via a first network (e.g., the Internet) using corresponding codes, APIs, languages, or interfaces. The browser/search application 112 may comprise a browser that may be used to access remotely a search application, e.g., via the Internet, or may comprise an integrated browser and search application. The browser/search application 112 may have a visual user interface for displaying search queries and results to the user. Examples of the browser/search application 112 may include Google Chrome™, Internet Explorer®, Mozilla Firefox®, and widgets.

Figures 2, 3:
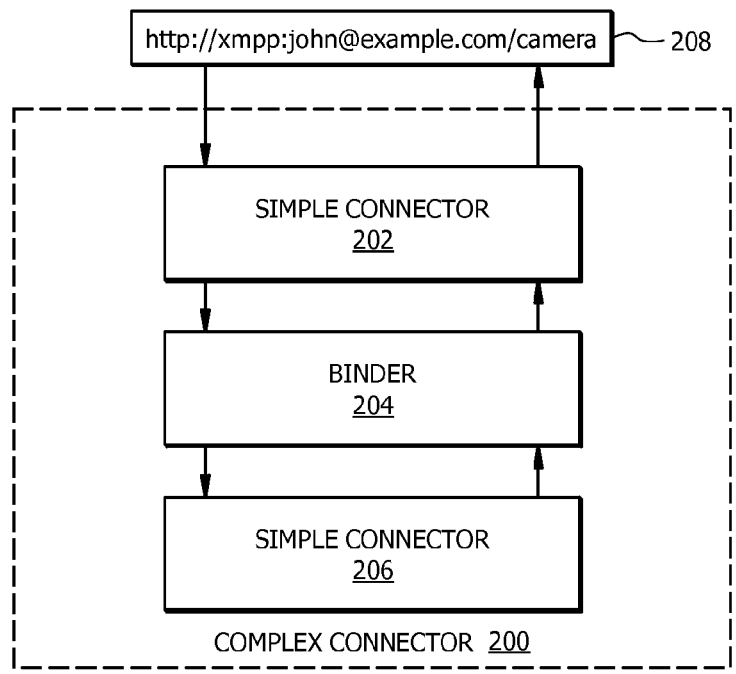
FIG. 2 depicts an embodiment of a complex connector for dereferencing layered URIs in web browsers using JavaScript.
FIG. 3 is an implementation matrix for an example complex connector.

FIG. 2 depicts an embodiment of a complex connector 200 for dereferencing layered URIs in web browsers, e.g., the browser/search application 112 of FIG. 1, using JavaScript. Complex connector 200, which may be instantiated in a browser, contains simple connector 202, e.g., an HTTP connector, a binder 204, e.g., an HTTP/XMPP binder, and a simple connector 206, e.g., an XMPP connector. Simple connectors may comprise a pointer or link between two data structures, or may otherwise be defined as objects that implement particular protocol stacks, e.g., HTTP connectors, SCTP connectors, etc. Simple connectors, e.g., simple connectors 202 and 206, are known in the art, and may be implemented in JavaScript or in web browsers, or both, as explained further below in connection with FIG. 3. Additionally, connectors implemented in JavaScript may be loaded into web browsers from remote web servers. Binders, e.g., binder 204, may be objects which combine simple connectors, e.g., by mapping the two protocol stacks. Binders are discussed further herein in connection with FIG. 4. Complex connectors, e.g., complex connector 200, may comprise two simple connectors and a binder. Example URI 208 is a two layer URI, having a first HTTP layer and a second XMPP layer. Upon a URI related event, e.g., clicking a hyperlink or submitting a form, the URI 208 may be received by a browser. Once identified as a layered URI, the browser (not pictured) may call the complex connector 200 using a dereference extension to dereference the layered URI 208. The complex connector 200 may invoke the interceptor chain of the simple connectors 202 and 206 and binder 204. Interceptor chain invokation may comprise passing URI 208 through a simple HTTP connector 202 via an HTTP request to HTTP/XMPP binder 204. HTTP/XMPP binder 204 may pass an XMPP stanza to simple XMPP connector 206, which with binder 204 may extract the HTTP information passed back to simple HTTP connector 202 via an HTTP response. Simple HTTP connector 202 may complete the complex connector 200 dereferencing of the URI by passing the payload data back to the browser, e.g., the HTML Document Object Model (DOM).

Connectors and binders may be created and registered with a user agent using JavaScript. Techniques for creating and registering connectors and binders may be apparent to those of skill in the art, and may be used separately or in connection with other known techniques. For example, one JavaScript snippet may contain an instruction to get an HTTP connector, e.g., connector 408 of FIG. 4, from a user agent, e.g., a browser, e.g., var connector1=new HTTPConnector( ). Another snippet may contain an instruction to implement a second connector, e.g., connector 414 of FIG. 4, namely, by creating a new XMPP client with an XMPP library, e.g., loaded into the browser by a remote web server, e.g., var xmpp=new XMPP ("talk.google.com"). Another snippet may contain an instruction for creating a connector for XMPP in JavaScript, e.g., var connector2=new Connector (XMPP). Yet another snippet may contain instructions to implement a third connector, e.g., connector 418 of FIG. 4, namely, by creating a WS from a user agent, e.g., var socket=new websocket( . . . ), and by creating a connector for the WS in JavaScript, e.g., var connector3=new Connector(socket). Still another snippet may contain an instruction for creating and implementing a first binder, e.g., binder 416 of FIG. 4, for binding the second and third connectors, e.g., var binder12=new Binder(connector2, connector3). Another snippet may contain an instruction for implementing a fourth connector, e.g., second complex connector 412 of FIG. 4, comprising the first binder, e.g., var connector12=new Connector(binder12). Yet another snippet may contain instructions for creating and implementing a second binder, e.g., binder 410 of FIG. 4, e.g., var binder01=new Binder(connector0, connector12), and a new connector, e.g., first complex connector 400 of FIG. 4, e.g., var connector01=new Connector(binder01). Still another snippet may contain an instruction for informing the user agent of the HTTP/XMPP connector, e.g., Connectors.register("http/xmpp", connector01). Since the Connector objects are exchanged between the user agent and User JavaScript, the Connector interface should be agreed upon by all browsers and all web applications. For this reason, standardization may be desired.

FIG. 3 is an implementation matrix 300 for an example complex connector. As stated above, simple connectors may be implemented either in JavaScript or in the web browser. Further, each complex connector may comprise two or more simple connectors to dereference a layered URI. Matrix 300 shows the combinations and permutations for implementing simple connectors P1 and P2, e.g., simple connectors 202 and 206 of FIG. 2, for dereferencing a layered URI, e.g., layered URI 208 of FIG. 2. As shown in matrix 300, and as stated above under FIG. 2, either simple connector may be implemented in JavaScript or implemented in the browser. Thus, P1 is associated with a JavaScript row and a browser row, and P2 is also associated with a JavaScript column and a browser column. The overlapping boxes of matrix 300 show the P1/P2 combination for the given row/column. Where a layered URI has more than two layers, thus requiring more than two simple connectors for dereferencing, the matrix 300 may be expanded, accounting for the recursive nesting explained further under FIG. 4. Where simple connectors are implemented in JavaScript, ultimately calling a simple connector implemented in the browser may be necessary to dereference the URI.

Figure 4:
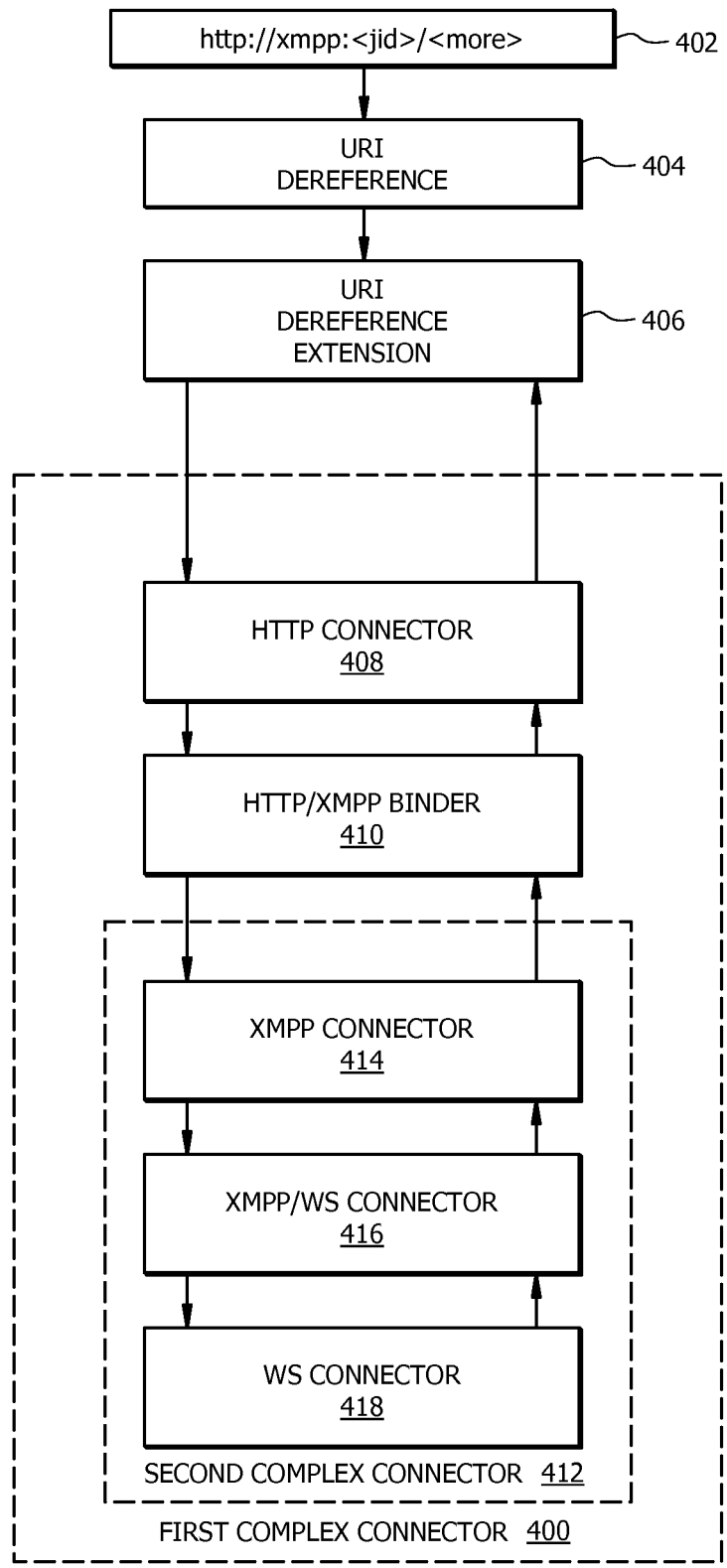
FIG. 4 depicts another embodiment of a complex connector for dereferencing layered URIs in web browsers using JavaScript.

FIG. 4 depicts another embodiment of a first complex connector 400 for dereferencing layered URIs in web browsers using JavaScript. FIG. 4 contains layered URI 402, which contains HTTP and XMPP layers. FIG. 4 assumes that the browser does not support XMPP, and also that WS is the underlying transport protocol for the XMPP layer. Consequently, dereferencing the URI requires at least three connectors. FIG. 4 contains a call to dereference the URI 404, e.g., a call made by a web browser upon a URI event, a URI dereference extension 406, a simple HTTP connector 408, e.g., the connector 202 of FIG. 2, an HTTP/XMPP binder 410, e.g., binder 204 of FIG. 2, and second complex connector 412, such that the second complex connector 412 is recursively nested within the first complex connector 400. Second complex connector 412 comprises a simple XMPP connector 414, an XMPP/WS binder 416, and a simple WS connector 418. FIG. 4 assumes that the browser (not pictured) supports HTTP and WS layer stacks, but not XMPP. Consequently, first complex connector 400 may comprise a JavaScript XMPP connector 414, web browser WS connector 418, and HTTP connector 408. Nesting complex connectors may thus form a recursively nested interceptor chain used by the URI dereference extension 406 to dereference layered URI 402.

Figure 5:
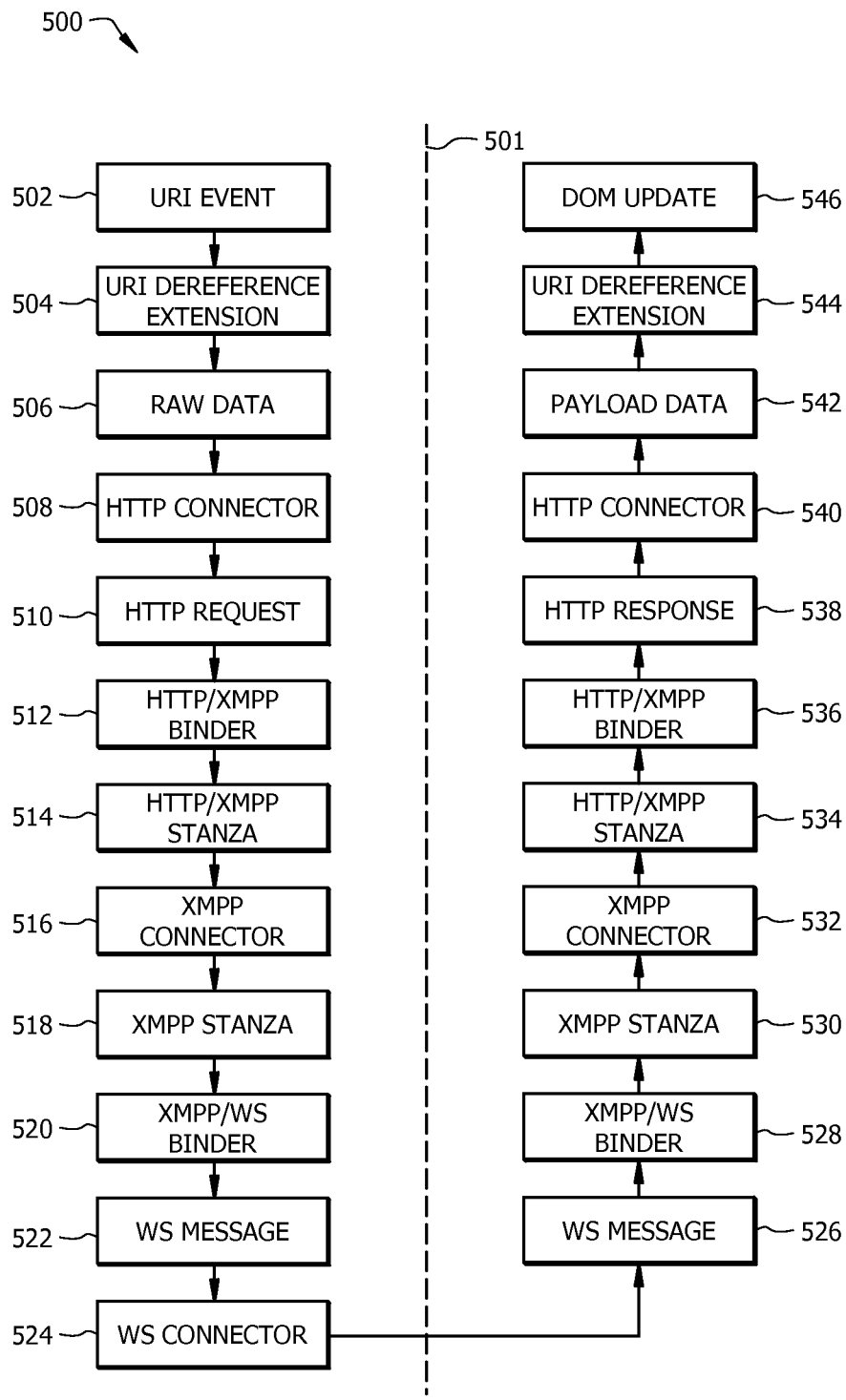
FIG. 5 is a flowchart describing the process of dereferencing the layered URI of the embodiment of FIG. 4.

FIG. 5 is a flowchart describing the process 500 of dereferencing the layered URI of the embodiment of FIG. 4. The components referenced in the blocks of FIG. 4 correspond to the identical components of FIG. 4. The two columns of FIG. 5 are shown separated by a line 501, with blocks in the first column occurring at a sender device, e.g., user device 100 of FIG. 1, and the blocks in the second column occurring at a recipient device, e.g., server 102 of FIG. 2. Process 400 may begin at 402 with a URI event, e.g., clicking a button, submitting a form, etc., which causes a browser on the sending user's side to attempt to dereference the layered HTTP/XMPP/WS URI. Because FIG. 4 assumes that the browser does not support XMPP, at block 404 a URI dereference extension may be called. The URI dereference extension may dynamically compose or instantiate the complex HTTP/XMPP connector from a simple HTTP connector, e.g., connector 202 of FIG. 2, an HTTP/XMPP binder, e.g., binder 204 of FIG. 2, and a second complex XMPP/WS connector (comprising two simple connectors and a binder) to form an interceptor chain based on the layers contained in the layered URI. As will be understood to those of skill in the art, differing layered URI dereference constructs may be dynamically constructed in different ways based on the URI-specific protocol stacks based on this disclosure, illustrated below in FIG. 5. The URI dereference extension may pass raw data, e.g., the form, etc., through block 406 to the HTTP connector at block 408. The HTTP connector may issue an HTTP request through block 510 to the HTTP/XMPP binder at block 512, which may encode an HTTP/XMPP stanza based on the mapping contained in the binder. At block 514 the HTTP/XMPP stanza created by the HTTP/XMPP binder may be passed to the XMPP connector of block 516, which may encode an XMPP stanza based on the mapping contained in the binder.

As stated under FIG. 4, XMPP generally requires an underlying two-way communication protocol. Consequently, although not explicitly set out in the URI, XMPP may establish the needed two-way connection using WS; other embodiments may employ alternate protocols. Thus, at block 518 an XMPP stanza may be passed by the XMPP connector to the XMPP/WS binder of block 520, which at block 522 sends a WS message to the WS connector of block 524. The WS connector of block 524 may pass a WS message at block 526 to a receiving user having a correspondingly constructed URI dereference extension. Upon receipt of the WS message, the XMPP/WS binder of block 528 may extract the XMPP stanza of block 430 from the WS message and send it to the XMPP connector of block 532. Similarly, the XMPP connector may extract the HTTP/XMPP stanza of block 534 from the XMPP stanza of block 530 and may pass the HTTP/XMPP stanza to the HTTP/XMPP binder of block 536. The HTTP/XMPP binder may send the HTTP response of block 538 to the HTTP connector of block 540. The HTTP connector may process the HTTP response and may send the payload data of block 542 to the URI dereference extension of block 544. At block 546, the DOM may update based on the payload data.

Figure 6:
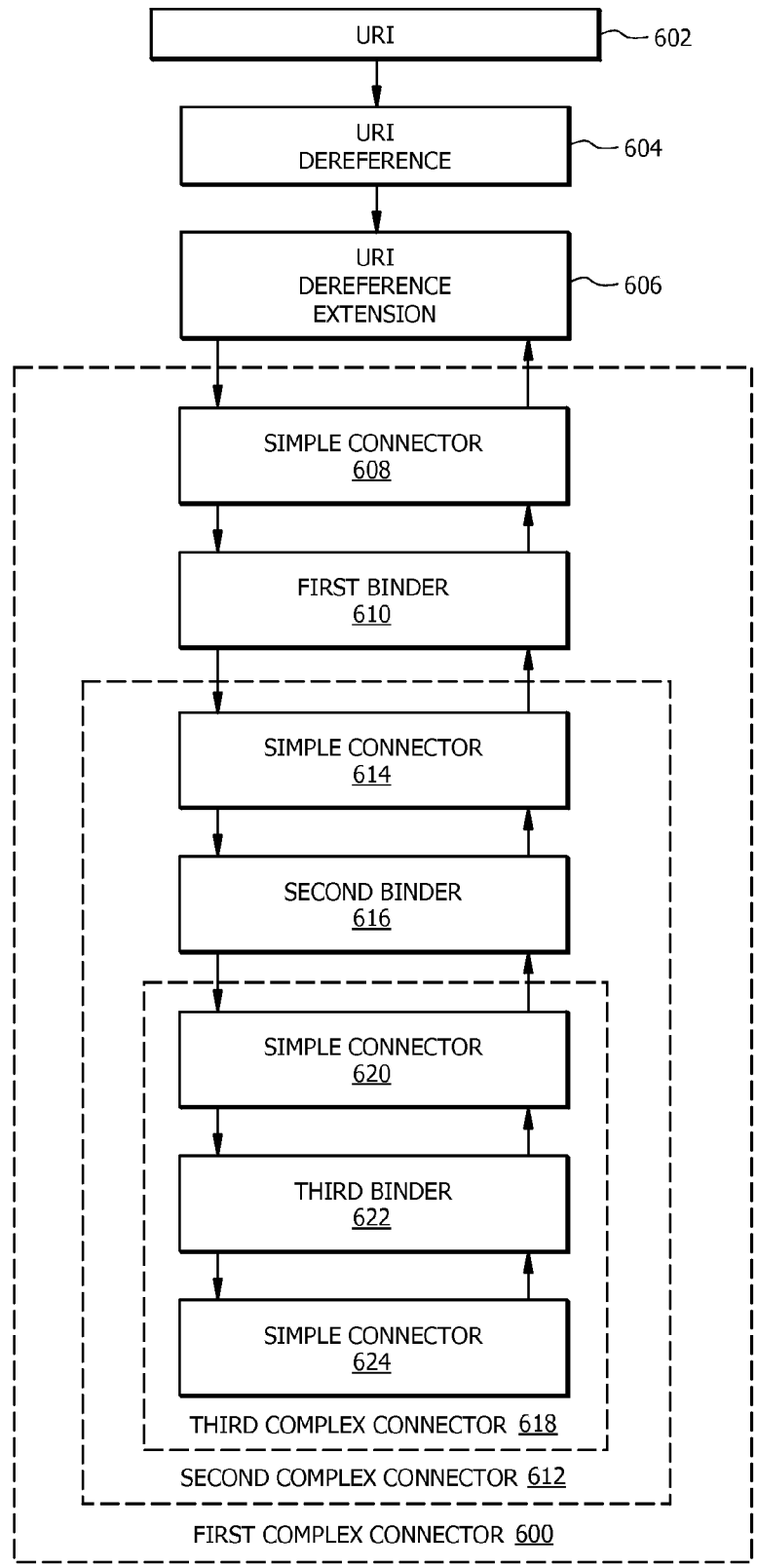
FIG. 6 depicts still another embodiment of a complex connector for dereferencing layered URIs in web browsers using JavaScript.

FIG. 6 depicts still another embodiment of a first complex connector 500 for dereferencing layered URIs in web browsers using JavaScript. FIG. 6 illustrates an embodiment of a system and method for dynamically constructing differing layered URI dereference constructs in different ways based on the URI-specific protocol stacks. FIG. 6 contains a layered URI 602, e.g., layered URI 402 of FIG. 4, a call to dereference the URI 604, a URI dereference extension 606, a simple connector 608, e.g., the connector 408 of FIG. 4, a first binder 610, e.g., binder 410 of FIG. 4, a second complex connector 612, e.g., second complex connector 412 of FIG. 4. Second complex connector 612 comprises a simple connector 614, a second binder 616, and a third complex connector 618, which third complex connector 618 comprises simple connectors 620 and 624 and a third binder 622. The third complex connector 618 may be required, e.g., if the browser, e.g., the browser of FIG. 4, did not support WS. Thus, as stated above, nesting complex connectors may form a recursively nested interceptor chain used by the URI dereference extension 606 to dereference layered URI 602.

Figure 7:
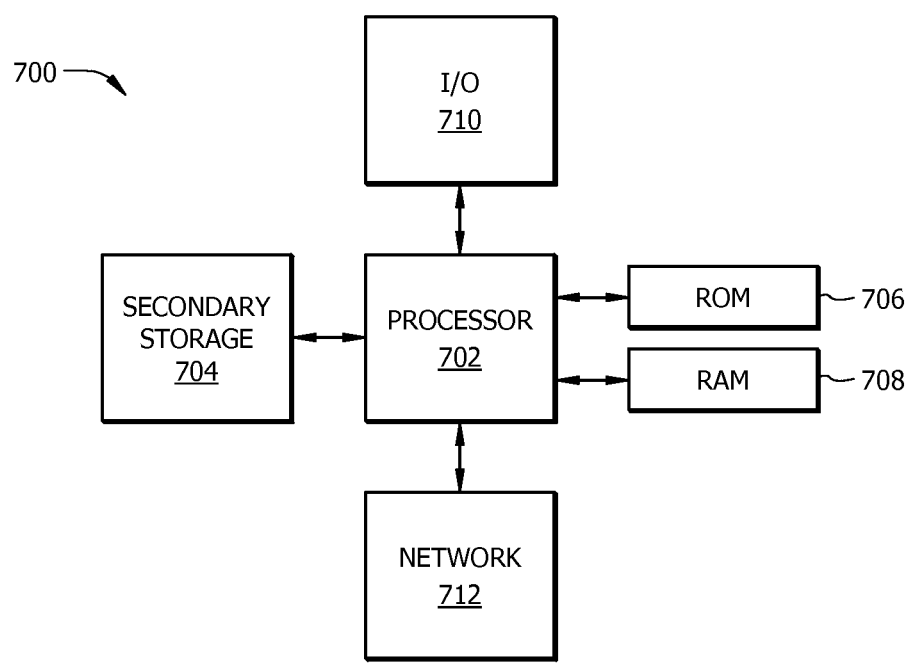
FIG. 7 illustrates a typical, general-purpose network component.

The components described above may be implemented on any general-purpose computer component, such as a computer or network component with sufficient processing power, memory resources, and network throughput capability to handle the necessary workload placed upon it. FIG. 7 illustrates a typical, general-purpose network component 700 suitable for implementing one or more embodiments of the components disclosed herein. The network component 700 includes a processor 702 (which may be referred to as a central processor unit or CPU) that is in communication with memory devices including secondary storage 704, read only memory (ROM) 706, random access memory (RAM) 708, input/output (I/O) devices 710, e.g., cameras, microphones, display screens, etc., and network connectivity devices 712. The processor 702 may be implemented as one or more CPU chips, or may be part of one or more application specific integrated circuits (ASICs) and/or digital signal processors (DSPs).

The secondary storage 704 is typically comprised of one or more disk drives or erasable programmable ROM (EPROM) and is used for non-volatile storage of data. Secondary storage 704 may be used to store programs that are loaded into RAM 708 when such programs are selected for execution. The ROM 706 is used to store instructions and perhaps data that are read during program execution. ROM 706 is a nonvolatile memory device that typically has a small memory capacity relative to the larger memory capacity of secondary storage 704. The RAM 708 is used to store volatile data and perhaps to store instructions. Access to both ROM 706 and RAM 708 is typically faster than to secondary storage 704.

At least one embodiment is disclosed and variations, combinations, and/or modifications of the embodiment(s) and/or features of the embodiment(s) made by a person having ordinary skill in the art are within the scope of the disclosure. Alternative embodiments that result from combining, integrating, and/or omitting features of the embodiment(s) are also within the scope of the disclosure. Where numerical ranges or limitations are expressly stated, such express ranges or limitations should be understood to include iterative ranges or limitations of like magnitude falling within the expressly stated ranges or limitations (e.g., from about 1 to about 10 includes, 2, 3, 4, etc.; greater than 0.10 includes 0.11, 0.12, 0.13, etc.). For example, whenever a numerical range with a lower limit, $R_l$, and an upper limit, $R_u$, is disclosed, any number falling within the range is specifically disclosed. In particular, the following numbers within the range are specifically disclosed: $R=R_l+k*(R_u-R_l)$, wherein k is a variable ranging from 1 percent to 100 percent with a 1 percent increment, i.e., k is 1 percent, 2 percent, 3 percent, 4 percent, 5 percent, . . . 50 percent, 51 percent, 52 percent, . . . , 95 percent, 96 percent, 97 percent, 98 percent, 99 percent, or 100 percent. Moreover, any numerical range defined by two R numbers as defined in the above is also specifically disclosed. The use of the term about means±10% of the subsequent number, unless otherwise stated. Use of the term "optionally" with respect to any element of a claim means that the element is required, or alternatively, the element is not required, both alternatives being within the scope of the claim. Use of broader terms such as comprises, includes, and having should be understood to provide support for narrower terms such as consisting of, consisting essentially of, and comprised substantially of. All documents described herein are incorporated herein by reference.

While several embodiments have been provided in the present disclosure, it should be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and could be made without departing from the spirit and scope disclosed herein.

What is claimed is:

1. A user agent comprising:
   one or more network connectivity devices configured to communicate with a network; and
   a hardware processor coupled to the network connectivity devices, wherein the processor is configured to:
   operate a browser comprising a visual user interface;
   compose a plurality of protocol stacks;
   dereference a layered User Resource Identifier (URI) using at least one of the plurality of protocol stacks, wherein the at least one protocol stack comprises a plurality of connectors and a binder, wherein at least one of the connectors is associated with a protocol that is unsupported by the user agent, and wherein the connector for the unsupported protocol is retrieved from a remote web server and joined by the binder to a connector associated with a protocol that is supported by the user agent;
   access resources identified by the layered URI via the network connectivity devices to create a resource representation; and
   forward the resource representation to the visual user interface for display to a user.

2. The apparatus of claim 1, wherein at least one protocol stack is dynamically composed upon receipt of a request to dereference the layered URI.

3. The apparatus of claim 1, wherein at least one connector of the at least one protocol stack is a complex connector.

4. The apparatus of claim 1, wherein at least one connector is implemented in JavaScript and at least one connector is implemented in a web browser.

5. The apparatus of claim 4, wherein the connector for the unsupported protocol is the connector implemented in JavaScript, and wherein forwarding the resource representation to the visual user interface comprises loading the connector for the unsupported protocol into the browser as retrieved from the remote web server.

6. The apparatus of claim 1, wherein the protocol stacks are recursively nested.

7. The apparatus of claim 1, wherein a first connector of the plurality of connectors is implemented in JavaScript, wherein a second connector of the plurality of connectors is implemented in a web browser, and wherein the binder is configured to compatibly connect the first connector and any of the plurality of connectors.

8. A computer program product comprising computer executable instructions stored on a non-transitory medium that when executed by a hardware processor cause the processor to perform the following:
   receive a layered User Resource Identifier (URI); and
   call a URI dereference extension, wherein the dereference extension is configured to construct a protocol stack, wherein the protocol stack comprises a first connector, a second connector, and a binder, wherein the first connector is associated with a protocol that is unsupported by the processor, wherein the second connector is associated with a protocol that is supported by the processor, wherein the first connector is retrieved, via a network connectivity device, from a remote web server and joined with the second connector by the binder, and wherein the first and second connectors are selected from a plurality of connectors based on the URI.

9. The computer program product of claim 8, wherein the first connector comprises a third connector, a fourth connector, and a binder.

10. The computer program product of claim 8, wherein the first connector is implemented in JavaScript.

11. The computer program product of claim 10, wherein the second connector is implemented in a web browser operating on the processor.

12. The computer program product of claim 11, wherein the URI is embedded in hypertext, wherein the web browser receives the layered URI and calls the URI dereference extension, and wherein the processor is further configured to change the state of the web browser based on the dereferenced layered URI.

13. The computer program product of claim 8, wherein the URI dereference extension is further configured to dereference a non-layered URI.

14. The computer program product of claim 8, wherein the URI is embedded in hypertext.

15. A method for dereferencing layered User Resource identifiers (URIs) by a user agent, the method comprising:
  receiving a layered URI at the user agent;
  calling a URI dereference extension with a hardware processor at the user agent;
  constructing a protocol stack using the URI dereference extension, wherein the protocol stack comprises a first connector, a second connector, and a binder, wherein the first connector and the second connector are instantiated based on the URI, and wherein the binder is instantiated based on the first connector and the second connector;
  dereferencing the URI with the URI dereference extension, wherein the first connector is associated with a protocol that is unsupported by the user agent, wherein the second connector is associated with a protocol that is supported by the user agent, and wherein the first connector is retrieved from a remote web server and joined to the second connector by the binder;
  access resources identified by the URI via a user agent network connectivity device to create a resource representation; and
  forward the resource representation to a visual user interface for display to a user.

16. The method of claim 15, wherein the first connector is a complex connector, and wherein the first connector comprises a third connector, a fourth connector, and a second binder.

17. The method of claim 16, wherein the third connector is a complex connector, and wherein the third connector comprises a fifth connector, a sixth connector, and a third binder.

18. The method of claim 15, wherein the URI dereference extension is called by a browser, wherein the first connector is implemented in JavaScript, and wherein the first connector is loaded into the browser from the remote web server.

19. The method of claim 15, wherein the URI dereference extension is configured to dereference a non-layered URI.

* * * * *